(No Model.)
M. F. DIVINE.
HAY FRAME.
No. 435,736. Patented Sept. 2, 1890.
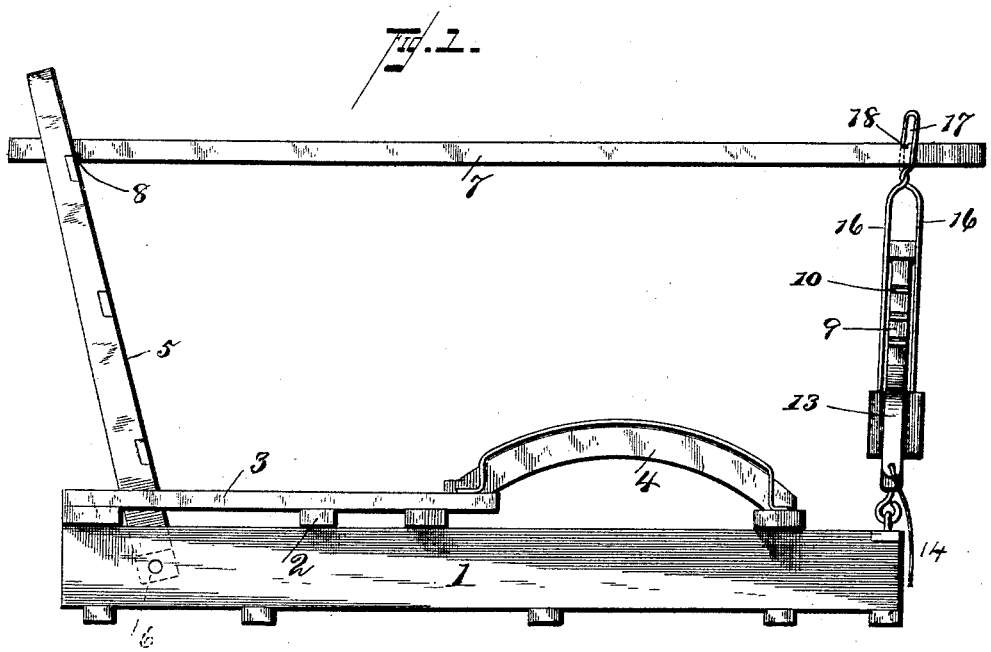
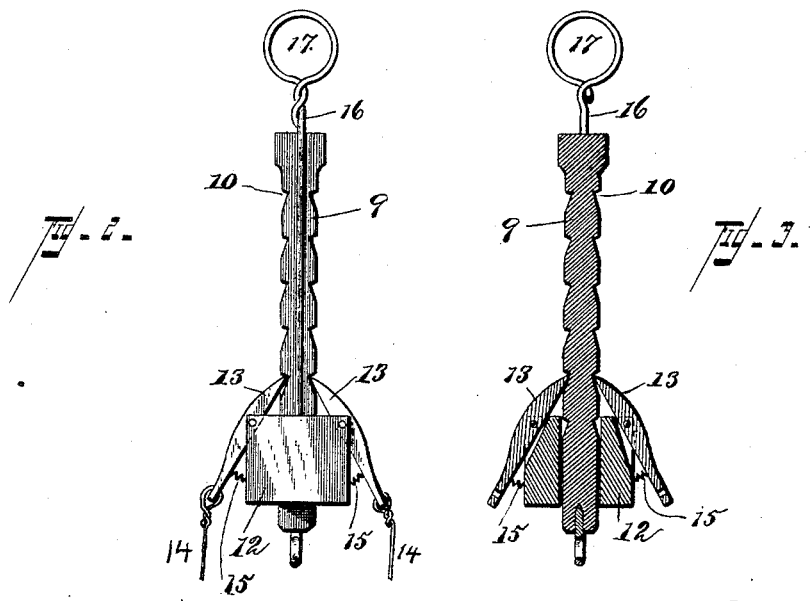
WITNESSES:
INVENTOR
THE NORRIS PETERS CO., PHOTO-LITHO., WASHINGTON, D. C.

UNITED STATES PATENT OFFICE.

MARTAIN FELIX DIVINE, OF SELLERSBURG, INDIANA.

HAY-FRAME.

SPECIFICATION forming part of Letters Patent No. 435,736, dated September 2, 1890.

Application filed May 7, 1890. Serial No. 350,900. (No model.)

*To all whom it may concern:*

Be it known that I, MARTAIN FELIX DIVINE, a citizen of the United States, and a resident of Sellersburg, in the county of Clark and State of Indiana, have invented certain new and useful Improvements in Hay-Frames; and I do hereby declare that the following is a full, clear, and exact description of the invention, which will enable others skilled in the art to which it appertains to make and use the same.

My invention relates to improvements in frames for hay-wagons, whereby the load may be readily and effectually secured and held from accidental displacement.

The invention consists in the novel features of construction and new combinations of parts hereinafter more fully described, and definitely pointed out in the claims.

In the accompanying drawings, Figure 1 is a side elevation of a hay-wagon frame with my improvements applied thereto. Fig. 2 is a front view of the pivoted rack-bar and adjustable cross-head, and Fig. 3 is a central sectional view of the same.

In the said drawings, the reference-numeral 1 designates the usual horizontal bars, 2 the cross-pieces, and 3 and 4 the front and rear overhanging wheel-guards.

5 designates the upright secured to the pivoted cross-bar 6 at the front end of the wagon, and against which the forward part of the load rests.

7 designates the horizontal securing-bar provided at one end with a transverse groove 8 for engaging with one of the cross-pieces of the upright, and which extends along the top of the load and holds it in place on the wagon or frame.

To the rear of the wagon is pivotally secured a rack-bar 9. This bar may be of wood, metal, or other suitable material, and upon two of its sides is provided with a series of notches, forming the rack-teeth 10.

12 designates a cross-head having a central aperture embracing the rack-bar, and is capable of reciprocating up and down upon said bar. In suitable recesses in this cross-head in the sides thereof coincident with the teeth on the rack-bar are pivotally secured the pawls 13, to the lower ends of which are attached operating cords or chains 14, by which they are thrown out of engagement with the said rack-teeth. Suitable springs 15 are interposed between the pawls and cross-head for throwing the former into engagement with the teeth 10. Secured at their lower ends to the cross-head 12 are the vertical rods 16, which are formed into or provided with a loop or eye 17 to receive the rear end of the securing-bar 7, which is provided on its upper side with a notch 18 to engage with the upper portion of said loop.

The operation will be readily understood from the above description. The hay is placed on the frame in the usual manner until a sufficient quantity has been supplied, when the securing-bar 7 is placed thereon and the groove in the front end thereof engaged with one of the cross-pieces of the upright 5. The rear end of said bar is then drawn or pressed down to properly bind the load upon the frame and said end then passed through the eye or loop 17 and the notch 18 engaged therewith. The bar 7 will be securely held in position by reason of the pawls in the cross-head engaging with the teeth on the rack-bar, thus preventing any upward movement of the rods 16, and preventing any accidental displacement of the load. When it is desired to unload the wagon, the pawls are disengaged from the rack-teeth by pulling the operating-cords, when the cross-head and attached rods will move upward, allowing the securing-bar to be removed. It will thus be seen that I provide a simple, effective, and economical device for securing a load of hay on a wagon, whereby there is little liability of its becoming accidentally displaced, but which can be readily operated to disengage the securing parts when it is desired to unload.

Having thus described my invention, what I claim is—

1. A hay-wagon frame having a pivoted upright at one end thereof, a pivoted bar at the other end, a securing-bar, and an adjustable cross-head working on said pivoted bar and provided with means to engage with said securing-bar, substantially as described.

2. The combination, with a hay-wagon frame having a pivoted upright at one end, of a pivoted rack-bar at the other end thereof, a securing-bar, an adjustable cross-head on said rack-bar having pawls engaging with said rack-bar, and rods secured to said cross-head and adapted to engage with and hold said securing-bar, substantially as described.

3. The combination, with a hay-wagon frame having a pivoted upright at one end, of a pivoted rack-bar 9, having teeth 10 at the other end, a cross-head adjustable upon said bar and provided with spring-pawls 13, engaging with said teeth, the vertical rods 16, with eye or loop 17, and the securing-bar 7, having groove 8 and notch 18, substantially as described.

In testimony that I claim the foregoing as my own I have hereunto affixed my signature in presence of two witnesses.

MARTAIN FELIX DIVINE.

Witnesses:
　JAMES REGAN,
　JOHN W. POWELL.